United States Patent
Liao et al.

(10) Patent No.: US 9,141,533 B2
(45) Date of Patent: Sep. 22, 2015

(54) DATA STORAGE DEVICE AND FLASH MEMORY CONTROL METHOD FOR PERFORMING GARBAGE COLLECTION

(71) Applicant: Silicon Motion, Inc., Jhubei (TW)

(72) Inventors: Jen-Hung Liao, Taichung (TW); Chia-Chien Wu, Hualien (TW)

(73) Assignee: Silicon Motion, Inc., Jhubei (TW)

( * ) Notice: Subject to any disclaimer, the term of this patent is extended or adjusted under 35 U.S.C. 154(b) by 304 days.

(21) Appl. No.: 13/744,989

(22) Filed: Jan. 18, 2013

(65) Prior Publication Data

US 2013/0326118 A1 Dec. 5, 2013

Related U.S. Application Data (60) Provisional application No. 61/653,736, filed on May 31, 2012.

(51) Int. Cl.
  *G06F 12/02* (2006.01)
  *G06F 13/00* (2006.01)
  *G06F 13/28* (2006.01)

(52) U.S. Cl.
  CPC ........ *G06F 12/0246* (2013.01); *G06F 12/0253* (2013.01); *G06F 12/0261* (2013.01); *G06F 2212/7205* (2013.01)

(58) Field of Classification Search
  CPC ................... G06F 12/0246; G06F 2212/7205; G06F 12/0253; G06F 12/0261
  USPC .......... 711/103, E12.008, E12.001, 165, 154; 707/813
  See application file for complete search history.

(56) References Cited

U.S. PATENT DOCUMENTS

| | | | |
|---|---|---|---|
| 7,996,642 B1* | 8/2011 | Smith | 711/167 |
| 2007/0140020 A1 | 6/2007 | Torabi et al. | |
| 2008/0307164 A1* | 12/2008 | Sinclair | 711/135 |
| 2012/0131278 A1 | 5/2012 | Chang et al. | |
| 2012/0198175 A1* | 8/2012 | Atkisson | 711/135 |
| 2012/0311237 A1* | 12/2012 | Park | 711/103 |
| 2013/0290668 A1* | 10/2013 | Na | 711/203 |

FOREIGN PATENT DOCUMENTS

| | | |
|---|---|---|
| TW | 200917027 A | 4/2009 |
| TW | 201022937 A | 6/2010 |

\* cited by examiner

*Primary Examiner* — Arpan P. Savla
*Assistant Examiner* — Shane Woolwine
(74) *Attorney, Agent, or Firm* — Wang Law Firm, Inc.; Li K. Wang; Stephen Hsu (57) ABSTRACT

A data storage device and a Flash memory control method. A data storage device comprises a Flash memory and a controller. The controller controls the Flash memory in accordance with firmware. When the firmware is available for at least a predetermined time period without being requested by a host, the controller, driven according to the firmware, performs a garbage-collection operation on the Flash memory without a request from the host.

8 Claims, 12 Drawing Sheets

DATA STORAGE DEVICE AND FLASH MEMORY CONTROL METHOD FOR PERFORMING GARBAGE COLLECTION

CROSS REFERENCE TO RELATED APPLICATIONS

This application is a non-provisional of and claims the benefit of U.S. Provisional Application No. 61/653,736 filed May 31, 2012, the entirety of which is incorporated by reference herein.

BACKGROUND OF THE INVENTION

1. Field of the Invention

The present invention relates to data storage devices, and in particular to flash memory control methods.

2. Description of the Related Art

Flash memory is a general non-volatile storage device that is electrically erased and programmed. A NAND Flash, for example, is primarily used in memory cards, USB flash devices, solid-state drives, eMMCs (embedded MultiMediaCards), and so on.

A storage array of a Flash memory (e.g. a NAND Flash) comprises a plurality of blocks. Each block comprises a plurality of pages. To release a used block as a spare block, all pages of an entire block have to be erased at once. "Garbage Collection" is operative to move valid data distributed over several blocks to a spare space and thereby only invalid pages remain in the several blocks. The blocks containing only invalid pages can be erased and released as spare blocks.

However, "Garbage Collection" conventionally requires considerable resources for calculation. A technique for efficiently operating a Flash memory is called for.

BRIEF SUMMARY OF THE INVENTION

A data storage device and a method for controlling a Flash memory are disclosed.

A data storage device in accordance with an exemplary embodiment of the invention comprises a Flash memory and a controller. The controller controls the Flash memory in accordance with firmware. When the firmware is available for at least a predetermined time period without being requested by a host, the controller, driven according to the firmware, performs a garbage-collection operation on the Flash memory without a request from the host.

A method for controlling a Flash memory in accordance with an exemplary embodiment of the invention comprises steps as follows: controlling the Flash memory in accordance with firmware; and when the firmware is available for at least a predetermined time period without being requested by a host, performing a garbage-collection operation on the Flash memory according to the firmware without a request from the host.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
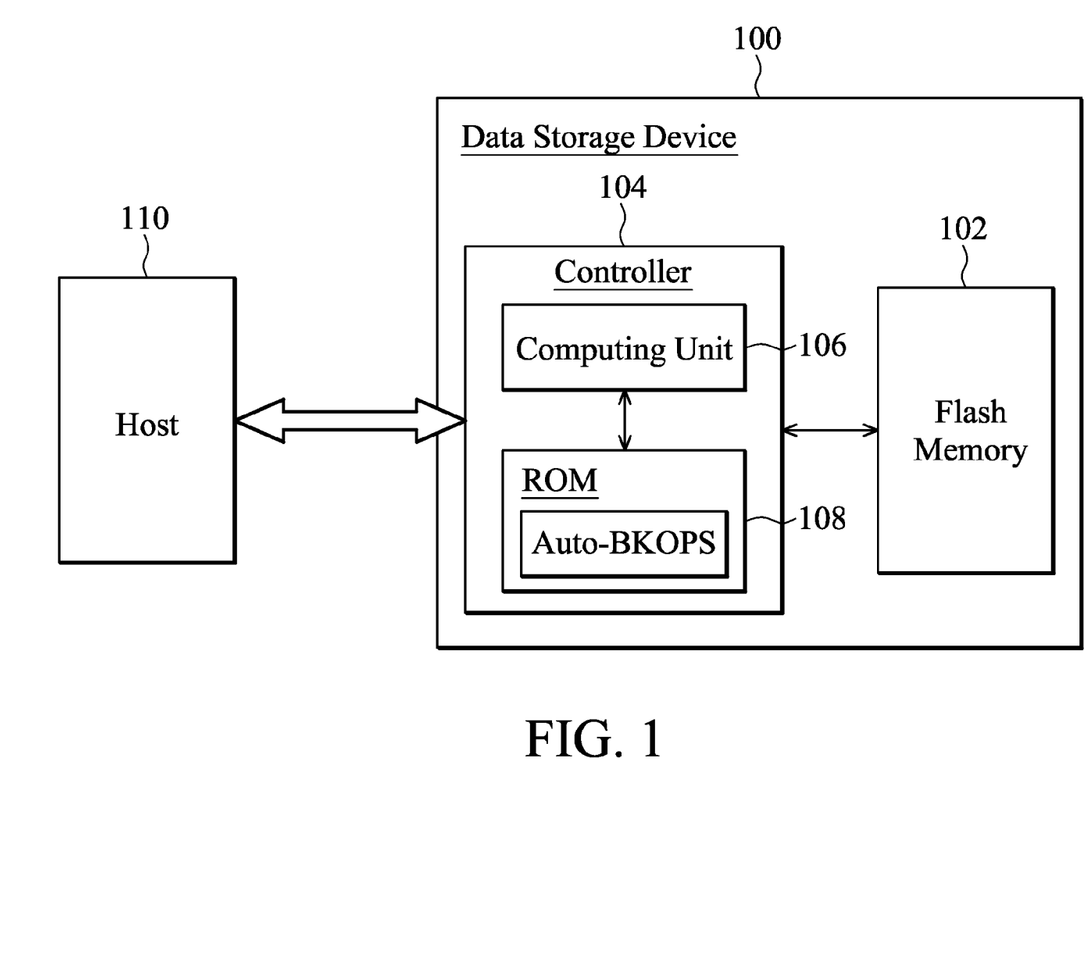
FIG. 1 is a block diagram depicting a data storage device 100 in accordance with an exemplary embodiment of the invention.

FIG. 1 is a block diagram depicting a data storage device 100 in accordance with an exemplary embodiment of the invention. The data storage device 100 comprises a Flash memory 102 and a controller 104, and may operate according to commands from a host 110. The controller 104 includes a computing unit 106 and a permanent memory (e.g. a ROM) 108. A combination of the persistent memory 108 and program code and data stored in it is known as firmware and is executed by the computing unit 106, and thereby the controller 104 controls the Flash memory 102 in accordance with the firmware. In this disclosure, the firmware is designed to provide auto background operations (abbreviated to auto-BKOPS) for automatic execution of a garbage-collection operation. When the firmware is available for at least a predetermined time period without being requested by the host 110, the controller 104, driven according to the firmware, performs the garbage-collection operation on the Flash memory 102 without any request from the host 110. System resources are effectively utilized by the auto-BKOPS.

Figure 2:
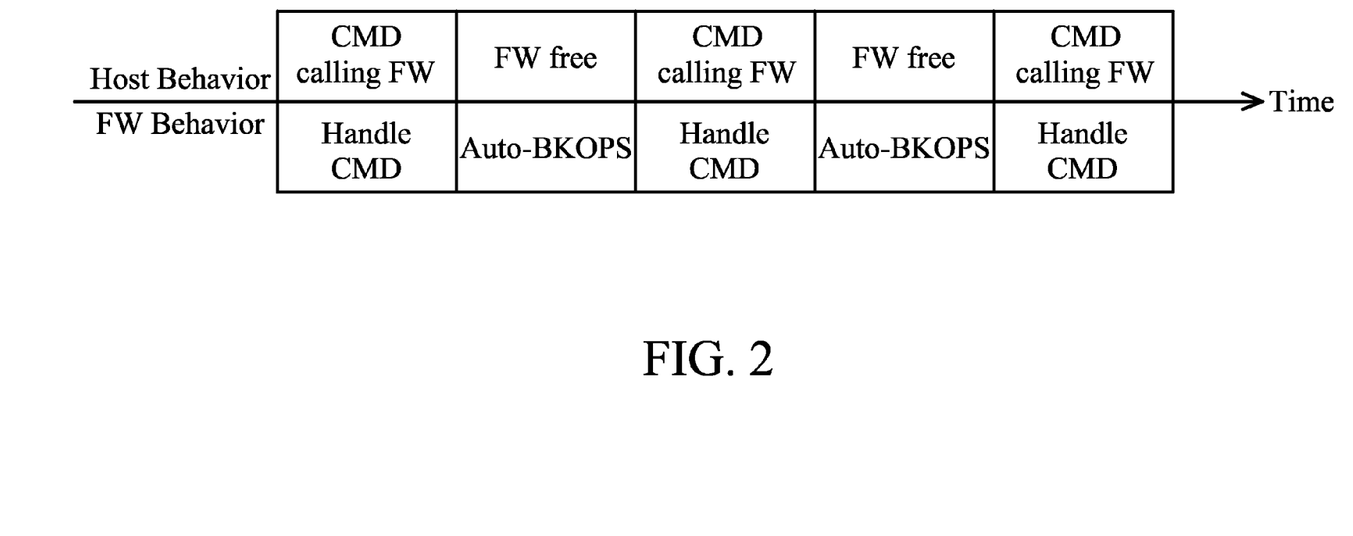
FIG. 2 shows the host behavior and the firmware (abbreviated to FW) behavior.

FIG. 2 shows the host behavior and the firmware (abbreviated to FW) behavior. When the host outputs commands requiring firmware operations, the firmware is executed to handle the host commands. When the host behavior is firmware-free (e.g., the host is idle or outputting commands requesting only hardware operations and unconcerned with firmware operations), the firmware is executed to perform the disclosed auto-BKOPS.

Figure 3:
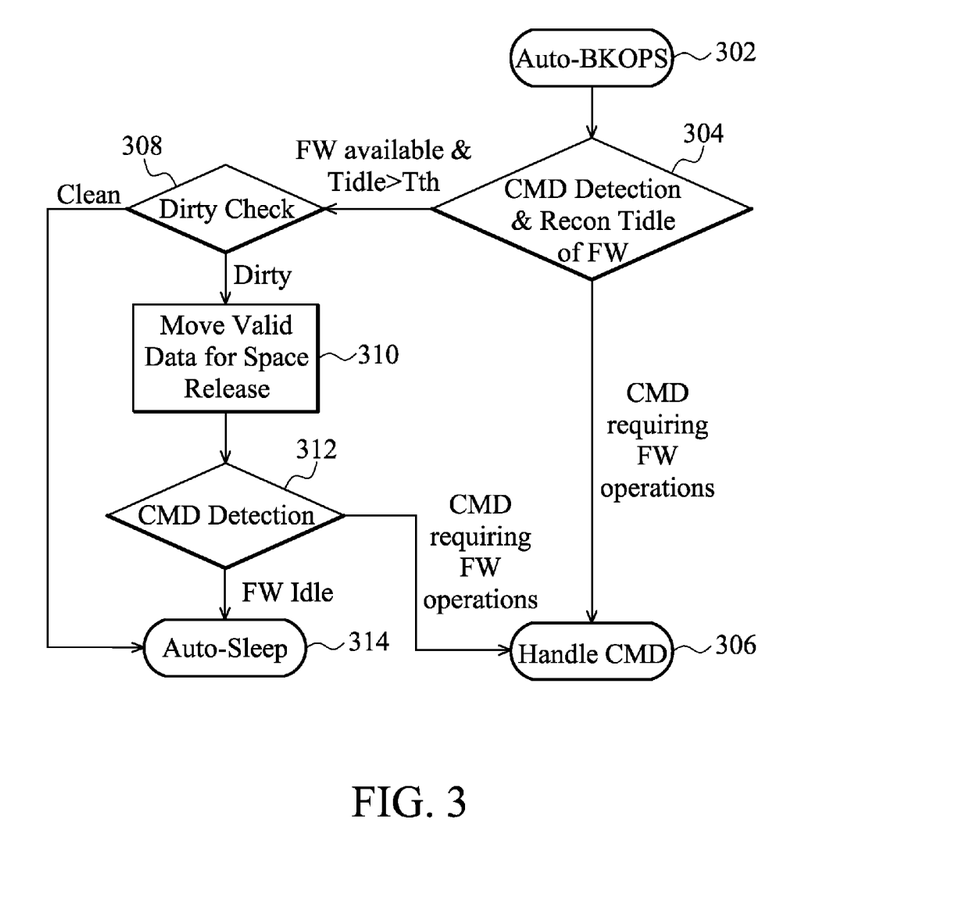
FIG. 3 is a flowchart depicting the auto-BKOPS in accordance with an exemplary embodiment of the invention.

FIG. 3 is a flowchart depicting the auto-BKOPS in accordance with an exemplary embodiment of the invention. The following discussion is with reference to the device structure shown in FIG. 1.

Auto-BKOPS 302 may be triggered according to command detection while considering an idle time Tidle of the firmware (in step 304). When the determining step 304 shows that a command requiring firmware operations is transmitted from the host 110, the firmware is executed to handle the command (306). When it is determined that the firmware is available (measured by Tidle) for at least a predetermined time period Tth without being requested by the host 110, step 308 is performed. In step 308, it is determined whether the Flash memory 102 is clean or dirty. When it is determined in 308 that the Flash memory 102 is clean, the controller 104 may be switched to an auto-sleep mode (314). When it is determined in 308 that the Flash memory 102 is dirty, valid data distributed over pages of several blocks are moved to the spare space (310) in order to release the space of the several blocks. After step 310, step 312 is performed for command detection. When the determining step 312 shows that a command requiring firmware operations is transmitted from the host 110, the firmware is executed to handle the command (306). When the determining step 312 shows that no command requiring firmware operations is transmitted from the host 110 (i.e. the firmware returns idle), the controller 104 may be switched to auto-sleep mode (314).

Figure 4:
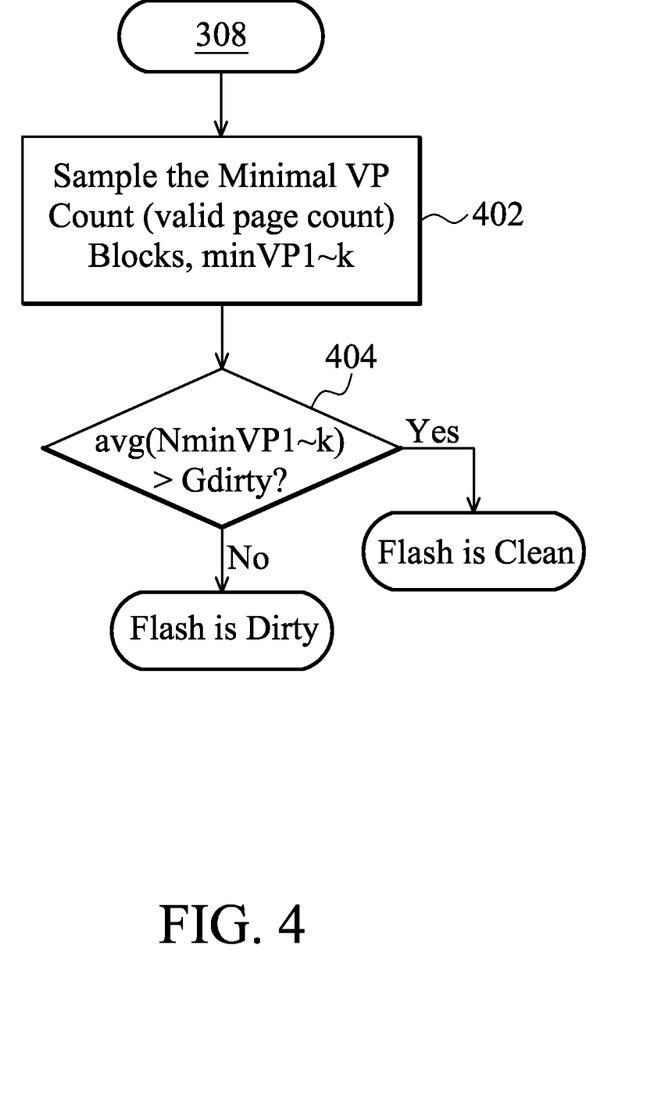
FIG. 4 is a flowchart depicting an exemplary embodiment of the dirty check step 308.

FIG. 4 is a flowchart depicting an exemplary embodiment of the dirty check step 308. In step 402, a plurality of low-efficiency blocks minVP1~k are sampled from the plurality of blocks of the Flash memory 102, 'k' representing the number of low-efficiency blocks. The plurality of low-efficiency blocks minVP1~k have relatively small amounts of valid pages in comparison with those remaining blocks. The low-efficiency blocks minVP1~k are picked out for classifying the Flash memory 102. In step S404, an average number of valid pages of the low-efficiency blocks, avg (NminVP1~k), is calculated and compared with a threshold number Gdirty. When avg(NminVP1~k) is higher than the threshold number Gdirty, the Flash memory 102 is classified as clean. Otherwise, the Flash memory 102 is classified as dirty. Note that the Flash memory classification rule is not limited to that taught in step 404. The Flash memory 102 may be classified according to other rules.

Figure 5:
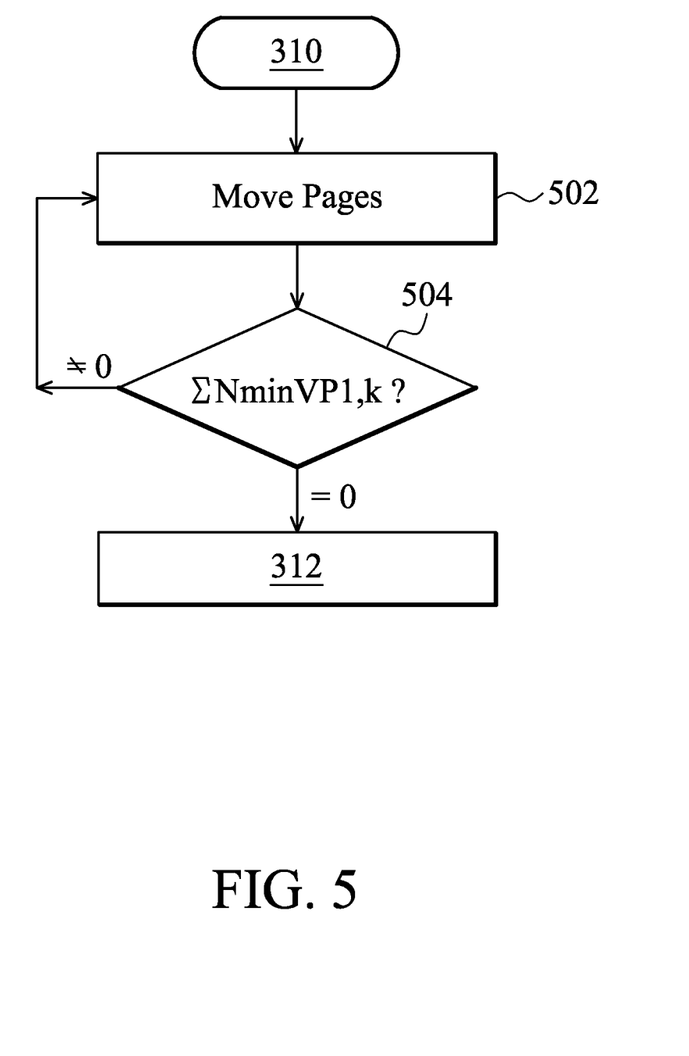
FIG. 5 is a flowchart depicting an exemplary embodiment of the valid data move step 310.

FIG. 5 is a flowchart depicting an exemplary embodiment of the valid data move step 310. In step 502, valid data distributed over the pages of the low-efficiency blocks minVP1~k are moved to other spare space. In step 504, it is determined whether valid data are all removed from the low-efficiency blocks minVP1~k. When it is determined in step 504 that a total number of valid pages within the low-efficiency blocks minVP1~k is zero (ΣNminVP1, k=0), step 310 is finished and the successive step 312 is performed. The determining step 504 is not intended to limit the scope of the invention. The step 310 may be ended according to other rules.

Figure 6:
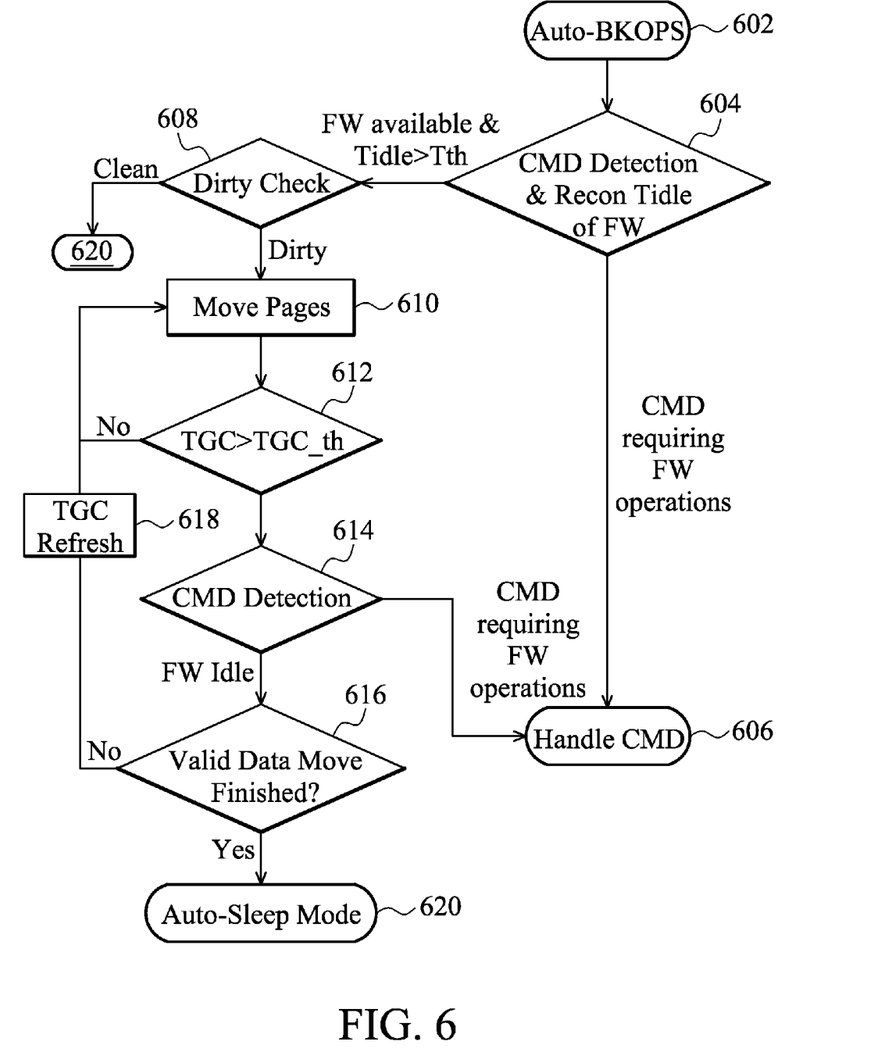
FIG. 6 is a flowchart depicting the auto-BKOPS in accordance with another exemplary embodiment of the invention.

FIG. 6 is a flowchart depicting the auto-BKOPS in accordance with another exemplary embodiment of the invention. The following discussion is with reference to the device structure shown in FIG. 1.

Auto-BKOPS 602 may be triggered according to command detection while considering the idle time Tidle of the firmware. When the determining step 604 shows that a command requiring firmware operations is transmitted from the host 110, the firmware is executed to handle the command (606). When it is determined in step 304 that the firmware is available (measured by Tidle) for at least a predetermined time period Tth without being requested by the host 110, step 608 is performed. In step 608, it is determined whether the Flash memory 102 is clean or dirty. When it is determined in 608 that the Flash memory 102 is clean, the controller 104 may be switched to an auto-sleep mode (620). When it is determined in 608 that the Flash memory 102 is dirty, valid data distributed over pages of several blocks are moved to the spare space in several stages (610 and 612) and thereby the space of the several blocks is released. The different stages may be separated according to a timer (TGC). At every time interval TGC_th, step 614 is performed for command detection. When the determining step 614 shows that a command requiring firmware operations is transmitted from the host 110, the firmware is executed to handle the command (606), and the garbage-collection operation originally executed is interrupted. In an exemplary embodiment, interruptions from commands requiring firmware operations are monitored. When frequent interruptions from commands requiring firmware operations are detected, the predetermined time period Tth may be extended. Further, when the determining step 614 shows that no command requiring firmware operations is transmitted from the host 110 (i.e. the firmware returns to idle), step 616 is performed to determine whether the valid data move has been completed. When the determining step 616 shows that the valid data move is finished, the controller 104 may be switched to auto-sleep mode (620). Otherwise, step 618 is performed to refresh the timer TGC and step 610 is performed again.

Figure 7:
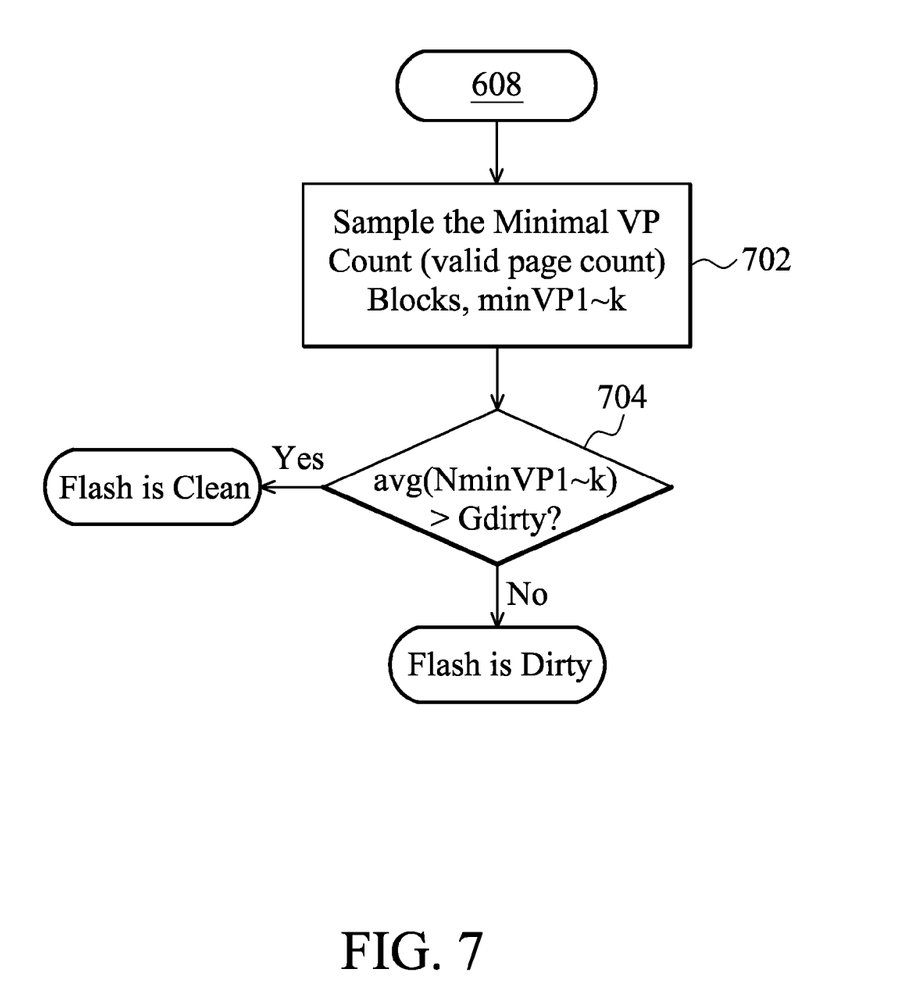
FIG. 7 is a flowchart depicting an exemplary embodiment of the dirty check step 608.

FIG. 7 is a flowchart depicting an exemplary embodiment of the dirty check step 608. In step 702, a plurality of low-efficiency blocks minVP1~k are sampled from the plurality of blocks of the Flash memory 102, with 'k' representing the number of low-efficiency blocks. The plurality of low-efficiency blocks minVP1~k have relatively small amounts of valid pages in comparison with those remaining blocks. The low-efficiency blocks minVP1~k are picked out for classifying the Flash memory 102. In step S704, the average number of valid pages in the low-efficiency blocks avg(NminVP1~k) is calculated and compared with a threshold number Gdirty. When avg(NminVP1~k) is more than the threshold number Gdirty, the Flash memory 102 is classified as clean. Otherwise, the Flash memory 102 is classified as dirty. Note that the Flash memory classification rule is not limited to that taught in step 704. The Flash memory 102 may be classified according to other rules.

Figure 8:
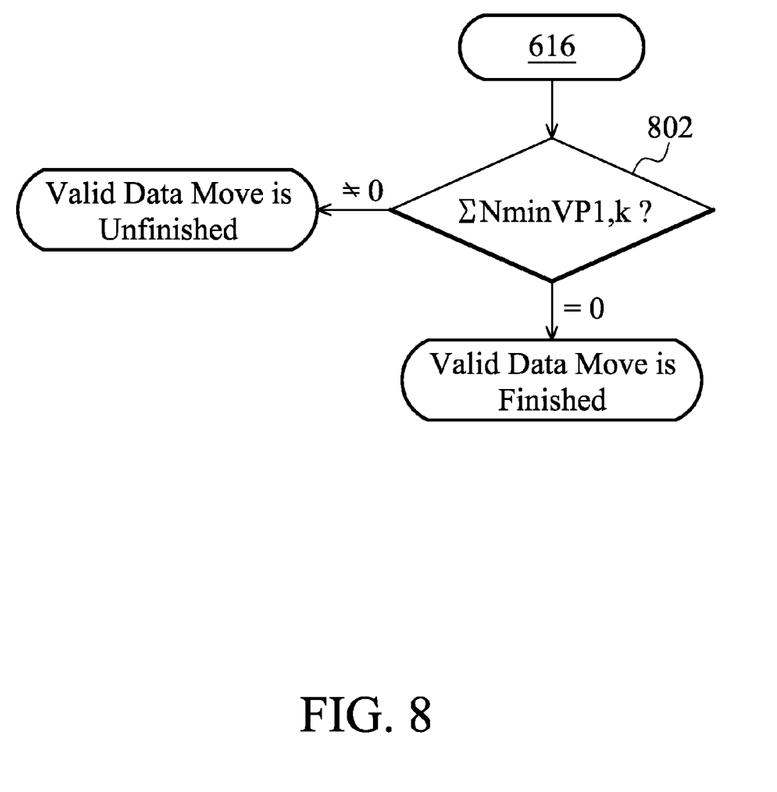
FIG. 8 is a flowchart depicting an exemplary embodiment of the valid data move step 616.

FIG. 8 is a flowchart depicting an exemplary embodiment of the valid data move step 616. In step 802, it is determined whether valid data are all removed from the low-efficiency blocks minVP1~k, and ΣN min VP1, k the total number of valid pages within the low-efficiency blocks minVP1~k, is calculated. When ΣN min VP1,k is zero, it means that valid data are all removed from the low-efficiency blocks minVP1~k, and the valid data move is finished. Note that the determining step 802 is not intended to limit the scope of the invention. Further, the value ΣN min VP1,k may be monitored during steps 610 and 612 as well for ending the valid data move midway through the execution of a stage.

Figure 9A:
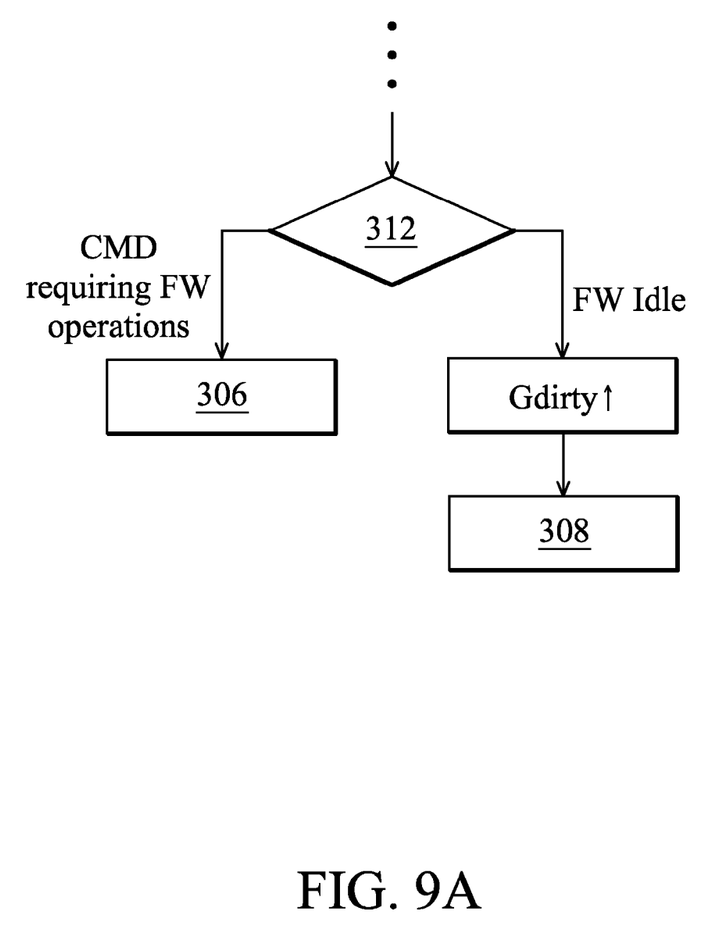
FIGS. 9A, 9B and 9C show how to gradually release the space of the Flash memory 102 while the firmware is kept idle.
Figure 9B:
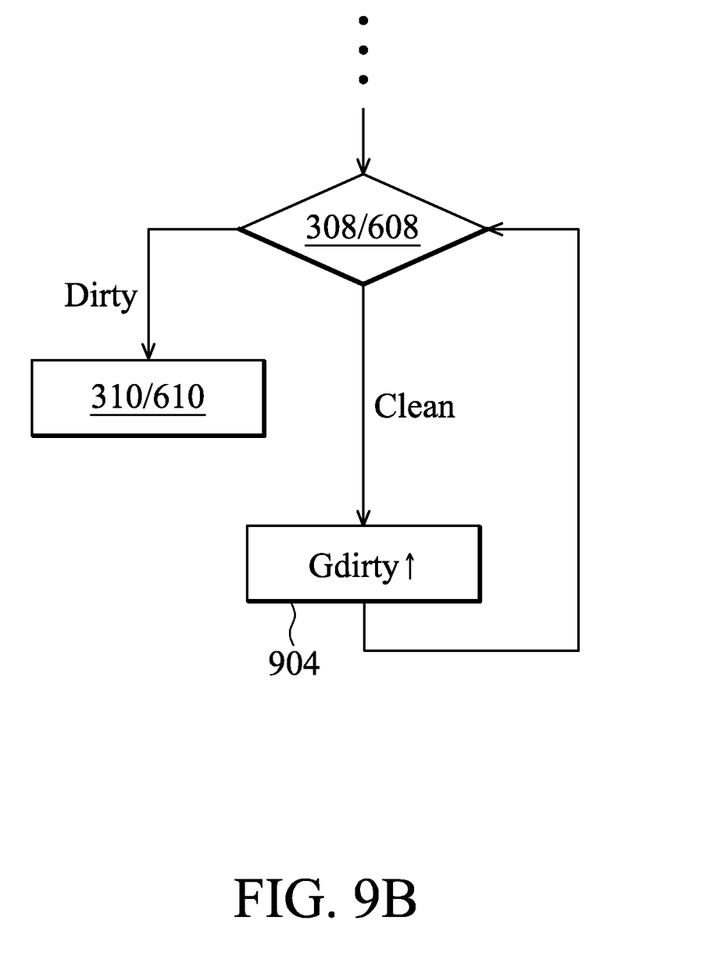
Figure 9C:
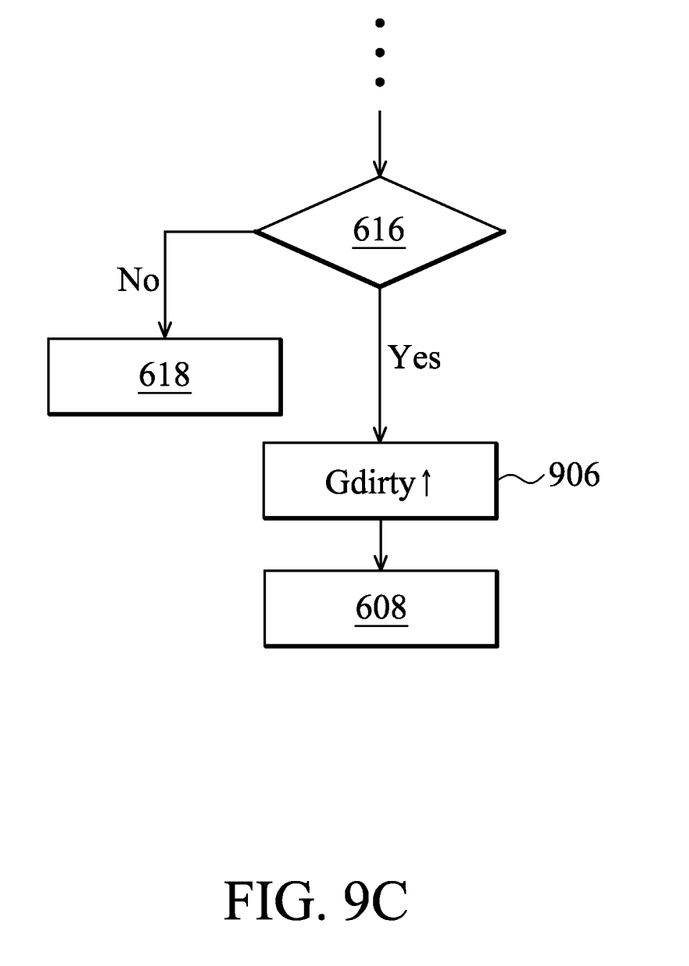

FIGS. 9A, 9B, and 9C show how to gradually release the space of the Flash memory 102 while the firmware is kept idle.

In FIG. 9A, the threshold number Gdirty utilized in the Flash memory classification (e.g. FIG. 4) is increased (in step 902) after the firmware returns to idle again after the determining step 312 of FIG. 3. With the loose threshold number Gdirty (increased in step 902), step 308 is performed again to observe a new set of low-efficiency blocks. In this manner, the Flash memory 102 is reclassified in accordance with the new set of low-efficiency blocks and, when the Flash memory 102 is reclassified as dirty, the controller 104 moves valid data contained in the new set of low-efficiency blocks to other blocks. Thus, more space is released via the auto-BKOPS.

In FIG. 9B, the threshold number Gdirty utilized in the Flash memory classification (e.g. FIG. 4 or FIG. 7) is increased (in step 904) after it is determined that the Flash memory 102 is clean (determined by step 308 of FIG. 3 or step 608 of FIG. 6). With the loose threshold number Gdirty (increased in step 904), step 308 or 608 is performed again to observe a new set of low-efficiency blocks. In this manner, the Flash memory 102 is reclassified in accordance with the new set of low-efficiency blocks and, when the Flash memory 102 is reclassified as dirty, the controller 104 moves valid data contained in the new set of low-efficiency blocks to other blocks. Thus, more space is released via the auto-BKOPS.

In FIG. 9C, the threshold number Gdirty utilized in the Flash memory classification (e.g. FIG. 7) is increased (in step 906) after it is determined that the valid data move has finished (determined in step 616 of FIG. 6). With the loose threshold number Gdirty (increased in step 906), step 608 of FIG. 6 is performed again to observe a new set of low-efficiency blocks. In this manner, the Flash memory 102 is reclassified in accordance with the new set of low-efficiency blocks and, when the Flash memory 102 is reclassified as dirty, the controller 104 moves valid data contained in the new set of low-efficiency blocks to other blocks. Thus, more space is released via the auto-BKOPS.

Figure 10:
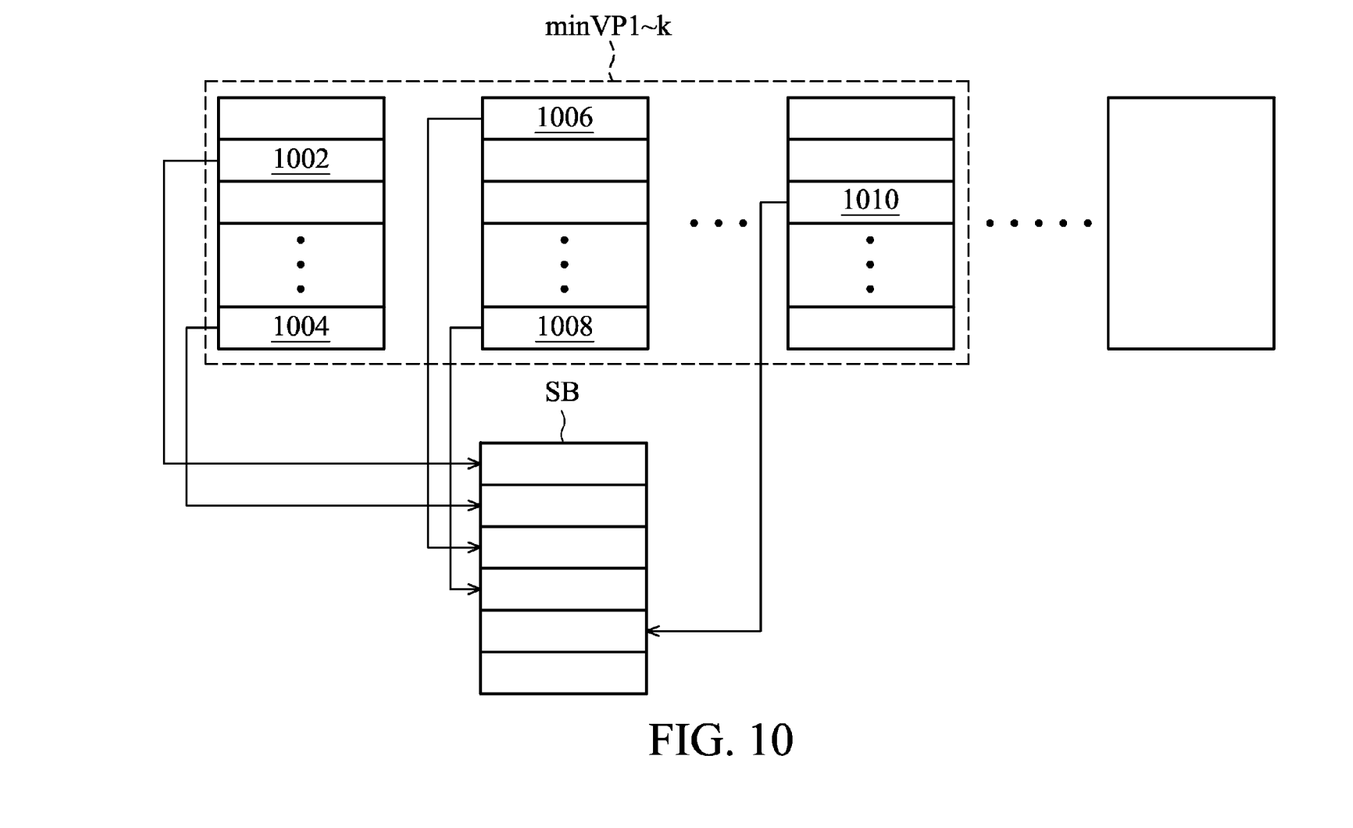
FIG. 10 depicts the valid data move performed as background operations.

FIG. 10 depicts the valid data move performed by background operations. As shown, valid pages 1002, 1004, 1006, 1008, and 1010 between the low-efficiency blocks minVP1~k are moved to a spare block SB. Thus, valid data between the low-efficiency blocks minVP1~k are all removed from the low-efficiency blocks minVP1~k and the space of the low-efficiency blocks minVP1~k can be safely released as spare space.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a Flash memory; and
   a controller, controlling the Flash memory in accordance with firmware, wherein when the firmware is available for at least a predetermined time period without being requested by a host, the controller, driven according to the firmware, performs a garbage-collection operation on the Flash memory without a request from the host,
   wherein:
   the Flash memory provides a plurality of blocks for data storage, each block including a plurality of pages;
   when the firmware is available for at least the predetermined time period without being requested by the host, the controller samples a plurality of low-efficiency blocks from the plurality of blocks in the Flash memory, the plurality of low-efficiency blocks having a smaller amount of valid pages in comparison to the remaining blocks in the Flash memory;
   the controller classifies the Flash memory in accordance with the low-efficiency blocks and, when classifying the Flash memory as dirty, the controller moves valid data contained in the low-efficiency blocks to other blocks;
   the controller classifies the Flash memory as clean when average number of valid pages in the low-efficiency blocks is higher than a threshold number, otherwise, the controller classifies the Flash memory as dirty; and
   when the Flash memory is classified as clean and no command requiring firmware operations is transmitted from the host, or when valid data are all removed from the low-efficiency blocks and no command requiring firmware operations is transmitted from the host, the controller increases the threshold number and observes a new set of low-efficiency blocks, reclassifies the Flash memory in accordance with the new set of low-efficiency blocks and the threshold number that has been increased and, when the Flash memory is reclassified as dirty, the controller moves valid data contained in the new set of low-efficiency blocks to other blocks.

2. The data storage device as claimed in claim 1, wherein the controller switches to an auto-sleep mode when the garbage-collection operation is finished and no command requiring firmware operations is transmitted from the host.

3. The data storage device as claimed in claim 1, wherein:
   the controller moves the valid data from the low-efficiency blocks to other blocks in several stages separated according to a timer and, after finishing each stage, the controller checks whether a command requiring firmware operations is received; and
   when receiving a command requiring firmware operations after a stage is finished, the controller switches to execute the received command and the garbage-collection operation originally executed is interrupted.

4. The data storage device as claimed in claim 3, wherein when detecting frequent interruptions from commands requiring firmware operations, the controller extends the predetermined time.

5. A method for controlling a Flash memory, comprising:
   controlling the Flash memory in accordance with firmware; and
   when the firmware is available for at least a predetermined time period without being requested by a host, performing a garbage-collection operation on the Flash memory according to the firmware without a request from the host,
   wherein:
   the Flash memory provides a plurality of blocks for data storage, each block including a plurality of pages;
   when the firmware is available for at least the predetermined time period without being requested by the host, sampling a plurality of low-efficiency blocks from the plurality of blocks of the Flash memory, the plurality of low-efficiency blocks having a smaller amount of valid pages in comparison to the remaining blocks in the Flash memory; and
   the Flash memory is classified in accordance with the low-efficiency blocks;
   when the Flash memory is classified as dirty, valid data contained in the low-efficiency blocks is moved to other blocks;
   the Flash memory is classified as clean when average number of valid pages in the low-efficiency blocks is more than a threshold number, otherwise, the Flash memory is classified as dirty; and
   when the Flash memory is classified as clean and no command requiring firmware operations is transmitted from the host, or when valid data are all removed from the low-efficiency blocks and no command requiring firmware operations is transmitted from the host, the threshold number is increased and a new set of low-efficiency blocks is observed, the Flash memory is reclassified in accordance with the new set of low-efficiency blocks and the threshold number that has been increased and, when the Flash memory is reclassified as dirty, valid data contained in the new set of low-efficiency blocks is moved to other blocks.

6. The method as claimed in claim 5, switching a controller controlling the Flash memory in accordance with the firmware to an auto-sleep mode when the garbage-collection operation is finished and no command requiring firmware operations is transmitted from the host.

7. The method as claimed in claim 5, wherein:
the valid data are moved from the low-efficiency blocks to other blocks in several stages separated according to a timer and, after finishing each stage, the method further checks whether a command requiring firmware operations is received; and when receiving a command requiring firmware operations after a stage is finished, the received command is executed and the garbage-collection operation originally executed is interrupted.

8. The method as claimed in claim 7, wherein when detecting frequent interruptions from commands requiring firmware operations, the predetermined time period is extended.

* * * * *